UNITED STATES PATENT OFFICE.

EMIL MILDE, OF GOLDSCHMIEDEN, GERMANY, ASSIGNOR TO ALUMINIUM INDUSTRIE AKTIENGESELLSCHAFT, OF NEUHAUSEN, SWITZERLAND, A CORPORATION OF SWITZERLAND.

PROCESS OF PRODUCING AMMONIA AND ALUMINA FROM ALUMINIUM NITRID.

1,115,003. Specification of Letters Patent. Patented Oct. 27, 1914.

No Drawing. Application filed June 10, 1913. Serial No. 772,769.

*To all whom it may concern:*

Be it known that I, EMIL MILDE, a citizen of the German Empire, and residing at Goldschmieden, near Breslau, Germany, have invented certain new and useful Improvements in Processes of Producing Ammonia and Alumina from Aluminium Nitrid, of which the following is a specification.

This invention relates to processes of simultaneously obtaining pure alumina and ammonia from aluminium nitrid or from mixtures containing aluminium nitrid, and its object is to provide an improved process by which these substances can be obtained cheaply from impure aluminium nitrid produced from materials containing alumina.

When boiling the ground product consisting of or containing aluminium nitrid at an ordinary pressure or at a pressure above atmospheric with lime or other alkaline-earth metals, ammonia being split off, it has been found that an aluminate of an alkaline-earth-metal is obtained which when boiled with a concentrated soda solution or solution of an alkali metal carbonate is readily converted into an aluminate of an alkali-metal and a carbonate of an alkaline-earth metal. The two conversions can however be united in one process by boiling the nitrid with lime and a concentrated solution of soda or carbonate of an alkali metal. The resulting aluminate of an alkaline-earth metal is then at once converted into an aluminate of an alkali-metal and a carbonate of an alkaline-earth metal. In this manner it is possible to combine the process of ammonia being split off with the recovery of solutions of pure aluminates of the alkali-metals. The advantage of this is that very concentrated aluminate solutions are obtained which would not be possible if soda, for example, were to be causticized with lime and the relatively diluted caustic solution thus obtained were to be employed for decomposing the nitrids. It has been found preferable to effect the conversion at a pressure above atmospheric, because in this event the conversion takes place much more rapidly.

The pure aluminate solutions obtained are employed according to one of the well-known processes for making pure alumina; for example, by introducing carbonic acid alumina is separated and the concentrated soda solution obtained is supplied again to the system in which the process is taking place.

I claim:—

1. A process of producing ammonia and pure alumina from aluminium nitrid, comprising boiling aluminium nitrid with the hydroxid of an alkaline earth metal, thereby producing ammonia and an aluminate of the alkaline earth metal; decomposing the aluminate thus formed, by boiling the same with a highly-concentrated solution of alkali-metal carbonate, into a highly-concentrated solution of alkali-metal aluminate and alkaline-earth-metal carbonate; and obtaining pure alumina from the alkali-metal aluminate.

2. A process of producing ammonia and pure alumina from aluminium nitrid, comprising boiling simultaneously the aluminium nitrid and the hydroxid of an alkaline-earth metal in a highly-concentrated solution of an alkali-metal carbonate, thereby producing ammonia and a concentrated solution of an alkali-metal aluminate; and then obtaining pure alumina from the alkali-metal aluminate.

In testimony whereof, I affix my signature in the presence of two witnesses.

EMIL MILDE.

Witnesses:
ERNST KATZ,
ERNST BLEISAL.